(12) United States Patent
Niu et al.

(10) Patent No.: US 12,313,158 B1
(45) Date of Patent: May 27, 2025

(54) LUBRICATING MECHANISM FOR PLANETARY GEAR TRAIN

(71) Applicants: ZF WIND POWER (TIANJIN) CO., LTD., Tianjin (CN); ZF Wind Power Antwerpen N.V., Lommel (BE)

(72) Inventors: Guowei Niu, Tianjin (CN); Dan Zhou, Tianjin (CN)

(73) Assignees: ZF WIND POWER (TIANJIN) CO., LTD., Tianjin (CN); ZF Wind Power Antwerpen N.V., Lommel (BE)

( * ) Notice: Subject to any disclaimer, the term of this patent is extended or adjusted under 35 U.S.C. 154(b) by 0 days.

(21) Appl. No.: 18/859,176

(22) PCT Filed: Mar. 21, 2023

(86) PCT No.: PCT/CN2023/082810
§ 371 (c)(1),
(2) Date: Oct. 23, 2024

(87) PCT Pub. No.: WO2023/207431
PCT Pub. Date: Nov. 2, 2023

(30) Foreign Application Priority Data

Apr. 24, 2022 (CN) .......................... 202210466578.0

(51) Int. Cl.
*F16H 57/04* (2010.01)
*F16C 33/10* (2006.01)

(52) U.S. Cl.
CPC ..... *F16H 57/0482* (2013.01); *F16H 57/0471* (2013.01); *F16C 33/106* (2013.01); *F16H 57/0479* (2013.01)

(58) Field of Classification Search
CPC ............ F16H 57/0482; F16H 57/0471; F16H 57/0427; F16H 57/0479; F16H 57/0486;
(Continued)

(56) References Cited

U.S. PATENT DOCUMENTS 5,188,576 A * 2/1993 Maguire ................. F16C 17/04
475/159
10,253,817 B2 * 4/2019 Plogmann ............... F16C 43/02

FOREIGN PATENT DOCUMENTS

| CN | 201560902 U | 8/2010 |
| CN | 205446565 U | 8/2016 |

(Continued)

*Primary Examiner* — Sherry L Estremsky
(74) *Attorney, Agent, or Firm* — Leydig, Voit & Mayer, Ltd.

(57) ABSTRACT

A lubricating mechanism for a planetary gear train, including a planetary gear, a sliding bearing, a planetary gear shaft, and a thrust bearing. The planetary gear is supported by the sliding bearing. The thrust bearing is arranged at an end surface of the planetary gear. A gap is formed between the thrust bearing and the end surface. The thrust bearing is provided with convex rings facing the end surface and being arranged at intervals in a radial direction. The end surface facing the thrust bearing is provided with grooves corresponding to the convex rings on a one-to-one basis, each groove being configured to accommodate a corresponding convex ring. An axial and radial clearance are formed between an outer surface of each convex ring and an inner surface of the groove opposite the corresponding convex ring. The axial and radial clearance are in communication with the gap.

19 Claims, 4 Drawing Sheets

(58) Field of Classification Search
CPC .. F16C 33/106; F16C 33/1065; F16C 17/045; F16C 32/0692
See application file for complete search history.

(56) References Cited

FOREIGN PATENT DOCUMENTS

| | | | | |
|---|---|---|---|---|
| CN | 109667918 | A | | 4/2019 |
| CN | 210178874 | U | | 3/2020 |
| EP | 3536993 | A1 | * | 9/2019 ............. F16C 17/10 |
| GB | 720358 | A | | 12/1954 |
| JP | 03009145 | A | * | 1/1991 |
| JP | H0722159 | U | * | 4/1995 |

* cited by examiner

LUBRICATING MECHANISM FOR PLANETARY GEAR TRAIN

CROSS REFERENCE TO RELATED APPLICATIONS

This application is a U.S. National Phase application under 35 U.S.C. § 371 of International Application No. PCT/CN2023/082810, filed on Mar. 21, 2023, and claims benefit to Chinese Patent Application No. CN 202210466578.0, filed on Apr. 24, 2022. The International Application was published in Chinese on Nov. 2, 2023 as WO 2023/207431 A1 under PCT Article 21(2).

FIELD

The present invention relates to a lubricating mechanism and a lubricating mechanism capable of establishing a desired oil pressure.

BACKGROUND

Wind turbine gearboxes are an important component of wind turbine systems for efficient power generation. Taking a gearbox which adopts a planetary system as an example, a planetary gear is supported on a planetary gear shaft by means of a bearing. Referring to FIG. 1, a planetary gear 1 is supported on a planetary gear shaft 2 by means of a sliding bearing 3 (a floating sliding bearing is used as an example in FIG. 1, and a fixed sliding bearing is also applicable). In order to limit an axial displacement, thrust bearings 4 are generally provided at two end surfaces 11, 12 of the planetary gear 1.

Referring primarily to FIG. 2, taking a left end surface 11 of the planetary gear 1 as an example, due to a gap between the thrust bearing 4 and the sliding bearing 3, lubricating oil will flow out of the gap (in the direction of the arrow). In other words, it is difficult to establish a desired oil pressure at the end surface of the planetary gear due to the presence of the gap, and the lower oil pressure is detrimental to the lubrication of the sliding bearing 3. In such a design, the working environment of the sliding bearing is not desired.

SUMMARY

In an embodiment, the present disclosure provides a lubricating mechanism for a planetary gear train, the planetary gear train comprising a planetary gear, a sliding bearing, a planetary gear shaft, and a thrust bearing. The planetary gear is supported on the planetary gear shaft by the sliding bearing. The thrust bearing is arranged at an end surface of the planetary gear. A gap is formed between the thrust bearing and the end surface of the planetary gear. The thrust bearing is provided with convex rings facing the end surface of the planetary gear, the convex rings being arranged at intervals in a radial direction. The end surface of the planetary gear facing the thrust bearing is provided with grooves corresponding to the convex rings on a one-to-one basis, each groove being configured to accommodate a corresponding convex ring. An axial clearance and a radial clearance are formed between an outer surface of each convex ring and an inner surface of the groove opposite the corresponding convex ring. The axial clearance and the radial clearance are in communication with the gap.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
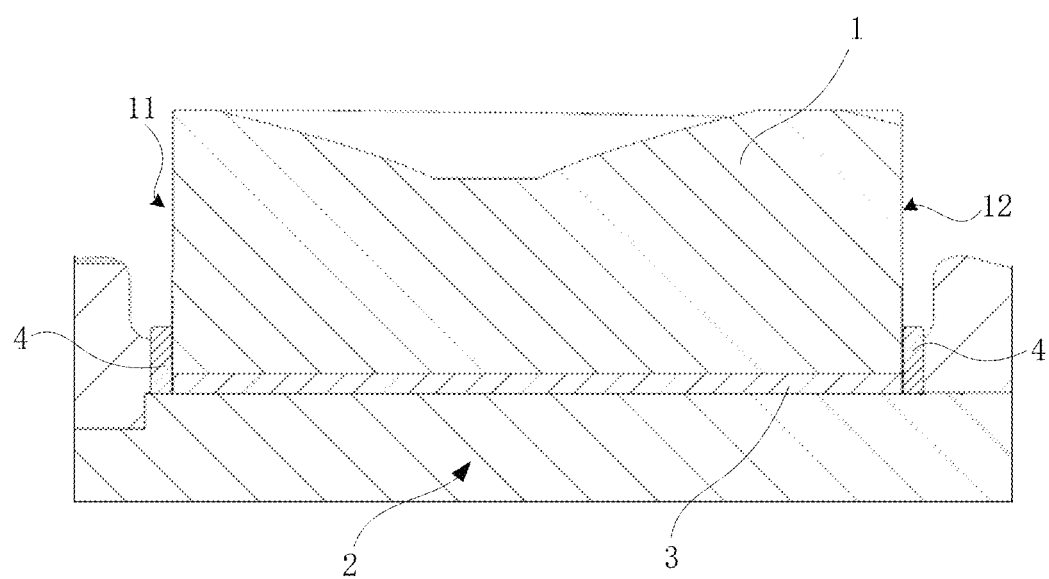
FIG. 1 shows a schematic diagram of the assembly of a planetary gear and a planetary gear shaft of a gearbox in the prior art.

In an embodiment, the present invention provides a lubricating mechanism for a planetary gear train that can establish a desired oil pressure, in order to solve the defects in the prior art that there is a gap between a thrust bearing and a sliding bearing in a gearbox, it is difficult to form a desired oil pressure, and it is detrimental to the lubrication of the sliding bearing.

Advantages of the present invention are realized by the following technical solutions.

A lubricating mechanism for a planetary gear train, the planetary gear train comprising a planetary gear, a sliding bearing, a planetary gear shaft and a thrust bearing, the planetary gear being supported on the planetary gear shaft by means of the sliding bearing, the thrust bearing being arranged at an end surface of the planetary gear, and a gap being formed between the thrust bearing and the end surface of the planetary gear, wherein the thrust bearing is provided with at least one convex ring facing the end surface of the planetary gear, the convex rings being arranged at intervals in a radial direction; the end surface of the planetary gear facing the thrust bearing is provided with grooves corresponding to the convex rings on a one-to-one basis, each groove being configured to accommodate a corresponding convex ring; and an axial clearance and a radial clearance are formed between an outer surface of each convex ring and an inner surface of the groove opposite the convex ring, wherein the axial clearance and the radial clearance are in communication with the gap.

The axial clearance is 0.5 mm-2 mm, and the radial clearance is 0.5 mm-2 mm, so that a proper oil pressure can be established, to ensure a lubricating effect at the sliding bearing.

Preferably, the shortest distance between two adjacent convex rings is the same as the shortest distance between two other adjacent convex rings for ease of machining.

Preferably, the shortest distance between two adjacent convex rings is different from the shortest distance between two other adjacent convex rings for different lubrication requirements in order to establish the proper oil pressure. By setting the distance between two adjacent convex rings reasonably, axial oil passages of different lengths are obtained, and the established oil pressure is adjusted accordingly.

Preferably, the convex ring and the thrust bearing are integrally formed.

Preferably, the convex ring has a coefficient of thermal expansion greater than that of the sliding bearing or than that of the planetary gear, facilitating the establishment of the oil pressure.

Preferably, in the radial direction, the shortest distance between two adjacent convex rings close to the sliding bearing is greater than the shortest distance between two adjacent convex rings away from the sliding bearing. That is, the convex rings are arranged more densely away from the sliding bearing, preventing the rapid discharge of the lubricating oil.

The present disclosure also provides a lubricating mechanism for a planetary gear train, the planetary gear train comprising a planetary gear, a sliding bearing, a planetary gear shaft and a thrust bearing, the planetary gear being supported on the planetary gear shaft by means of the sliding bearing, the thrust bearing being arranged at an end surface of the planetary gear, and a gap being formed between the thrust bearing and the end surface of the planetary gear, wherein the end surface of the planetary gear facing the thrust bearing is provided with at least one convex ring, the convex rings being arranged at intervals in a radial direction; the thrust bearing is provided with grooves facing the end surface of the planetary gear and corresponding to the convex rings on a one-to-one basis, each groove being configured to accommodate a corresponding convex ring; and an axial clearance and a radial clearance are formed between an outer surface of each convex ring and an inner surface of the groove opposite the convex ring, wherein the axial clearance and the radial clearance are in communication with the gap.

The axial clearance is 0.5 mm-2 mm, and the radial clearance is 0.5 mm-2 mm, so that a proper oil pressure can be established, to ensure a lubricating effect at the sliding bearing.

Preferably, the shortest distance between two adjacent convex rings is the same as the shortest distance between two other adjacent convex rings for the sake of machining convenience.

Preferably, the shortest distance between two adjacent convex rings is different from the shortest distance between two other adjacent convex rings for different lubrication requirements in order to establish the proper oil pressure. By setting the distance between two adjacent convex rings reasonably, axial oil passages of different lengths are obtained, and the established oil pressure is adjusted accordingly.

Preferably, the convex ring and the planetary gear are integrally formed.

Preferably, the convex ring has a coefficient of thermal expansion greater than that of the sliding bearing or than that of the planetary gear, facilitating the establishment of the oil pressure.

Preferably, in the radial direction, the shortest distance between two adjacent convex rings close to the sliding bearing is greater than the shortest distance between two adjacent convex rings away from the sliding bearing. That is, the convex rings are arranged more densely away from the sliding bearing, preventing the rapid discharge of the lubricating oil.

The present disclosure also provides a lubricating mechanism for a planetary gear train, the planetary gear train comprising a planetary gear, a sliding bearing, a planetary gear shaft and a thrust bearing, the planetary gear being supported on the planetary gear shaft by means of the sliding bearing, the thrust bearing being arranged at an end surface of the planetary gear, and a gap being formed between the thrust bearing and the end surface of the planetary gear, wherein the thrust bearing is provided with at least one first groove facing the end surface of the planetary gear, the first grooves being arranged at intervals in a radial direction; the end surface of the planetary gear facing the thrust bearing is provided with second grooves corresponding to the first grooves on a one-to-one basis; an accommodating space is formed by each first groove and a corresponding second groove; a barrier is provided in each accommodating space; and an axial clearance and a radial clearance are formed between an inner surface of each accommodating space and an outer surface of the barrier accommodated in the accommodating space, wherein the axial clearance and the radial clearance are in communication with the gap.

The axial clearance is 0.5 mm-2 mm, and the radial clearance is 0.5 mm-2 mm, so that a proper oil pressure can be established, to ensure a lubricating effect at the sliding bearing. The barrier may be made of nylon.

Preferably, the axial clearance comprises:
a first axial clearance jointly defined by a bottom surface of the first groove and a side surface of the barrier facing the first groove, and a second axial clearance jointly defined by a bottom surface of the second groove and a side surface of the barrier facing the second groove.

Preferably, the radial clearance comprises a first radial clearance and a second radial clearance, wherein
the first radial clearance is defined by a side surface of the first groove close to the sliding bearing, a side surface of the second groove close to the sliding bearing, and a surface of the barrier facing the sliding bearing; and
the second radial clearance is defined by a side surface of the first groove away from the sliding bearing, a side surface of the second groove away from the sliding bearing, and a surface of the barrier facing away from the sliding bearing.

Preferably, in the radial direction, the shortest distance between two adjacent accommodating spaces is the same as the shortest distance between two other adjacent accommodating spaces for ease of machining.

Preferably, in the radial direction, the shortest distance between two adjacent accommodating spaces is different from the shortest distance between two other adjacent accommodating spaces for different lubrication requirements in order to establish the proper oil pressure. By setting the distance between two adjacent accommodating spaces reasonably, axial oil passages of different lengths are obtained, and the established oil pressure is adjusted accordingly.

Preferably, the barrier has a coefficient of thermal expansion greater than that of the sliding bearing or than that of the planetary gear, facilitating the establishment of the oil pressure.

Preferably, in the radial direction, the shortest distance between two adjacent accommodating spaces close to the sliding bearing is greater than the shortest distance between two adjacent accommodating spaces away from the sliding bearing. That is, the convex rings are arranged more densely away from the sliding bearing, preventing the rapid discharge of the lubricating oil.

The technical effects obtained by embodiments of the present invention are as follows.
1. Due to the presence of the radial clearance and the axial clearance, a path for lubricating oil is made tortuous and an appropriate oil pressure is more easily established at the gap, thereby preventing the lubricating oil from being rapidly discharged from the gap, such that there is always a sufficient amount of lubricating oil at the sliding bearing, ensuring a lubricating effect of the sliding bearing.

2. The convex ring and the barrier each have a greater coefficient of thermal expansion than the sliding bearing or the planetary gear, allowing the size of the radial clearance and the axial clearance to be adjusted at different temperatures. The radial clearance and the axial clearance are smaller at higher temperatures, so that a higher oil pressure can be established, preventing rapid loss of the lubricating oil. Since the flow rate of the lubricating oil at lower temperatures is less than that at higher temperatures, larger radial and axial clearances will not have a significant effect on the establishment of the oil pressure.

3. In the solution where the barrier is employed, due to the axial clearance between the planetary gear and the barrier, the barrier rotates circumferentially with the planetary gear. The circumferential movement of the barrier (the rotational speed difference between the circumferential movement of the barrier and the rotation of the planetary gear) will cause turbulences of the lubricating oil, and the turbulences will be increased due to the resistance of the barrier, thereby further enhancing the lubricating effect.

Specific implementations of embodiments of the present invention will be further described below with reference to the accompanying drawings.

Figure 3:
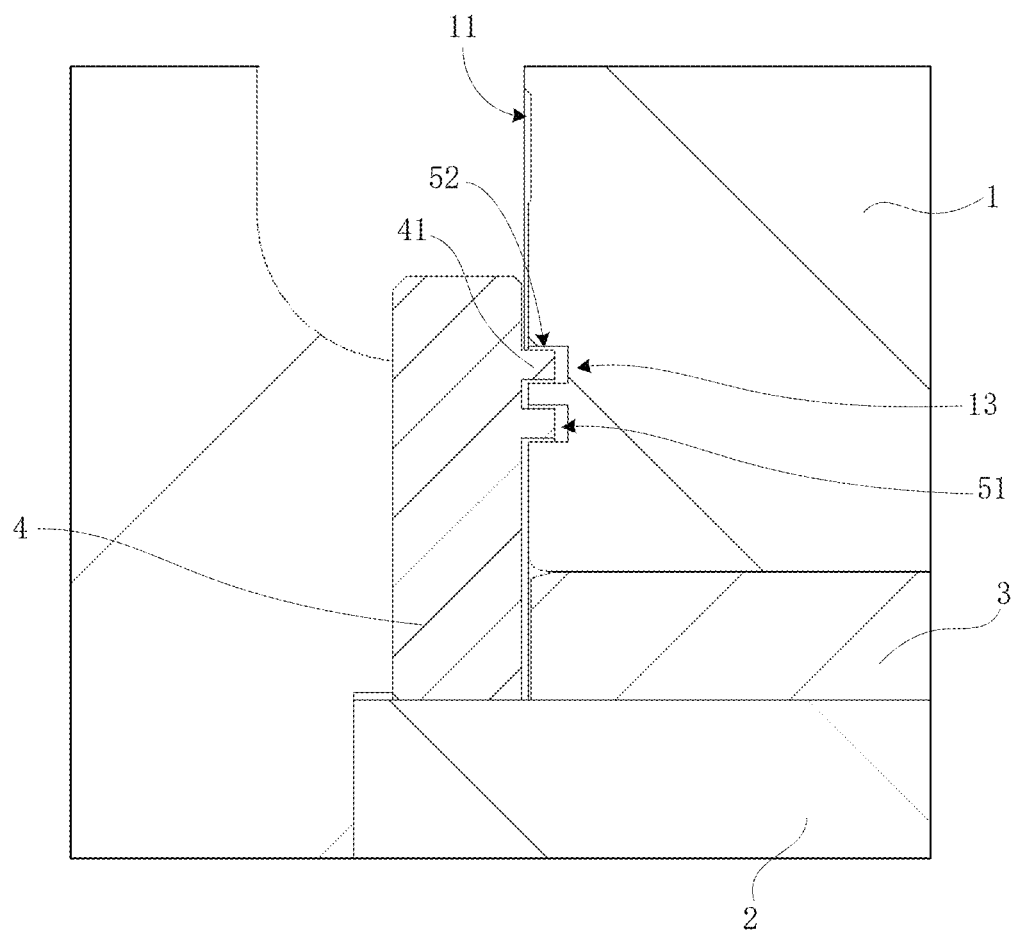
FIG. 3 is a schematic diagram of a lubricating mechanism of a planetary gear train according to a first embodiment of the present invention.

Referring to FIG. 3, a lubricating mechanism of a planetary gear train according to a first embodiment of the present invention is described. The planetary gear train comprises a planetary gear 1, a sliding bearing 3, a planetary gear shaft 2 and a thrust bearing 4. The planetary gear 1 is supported on the planetary gear shaft 2 by means of the sliding bearing 3, the thrust bearing 4 is arranged at an end surface of the planetary gear 1 (a left end surface 11 is shown), and a gap is formed between the thrust bearing 4 and the end surface 11 of the planetary gear 1.

Taking the left end surface 11 of the planetary gear 1 as an example, the lubricating mechanism further comprises: at least one convex ring 41 provided on the thrust bearing 4 and facing the end surface 11 of the planetary gear 1. The convex rings 41 are arranged at intervals in a radial direction, and two convex rings 41 are taken as an example here. Accordingly, the end surface of the planetary gear 1 facing the thrust bearing 4 is provided with grooves 13 corresponding to the convex rings 41 on a one-to-one basis. Each groove 13 is configured to accommodate a corresponding convex ring 41.

Figure 2:
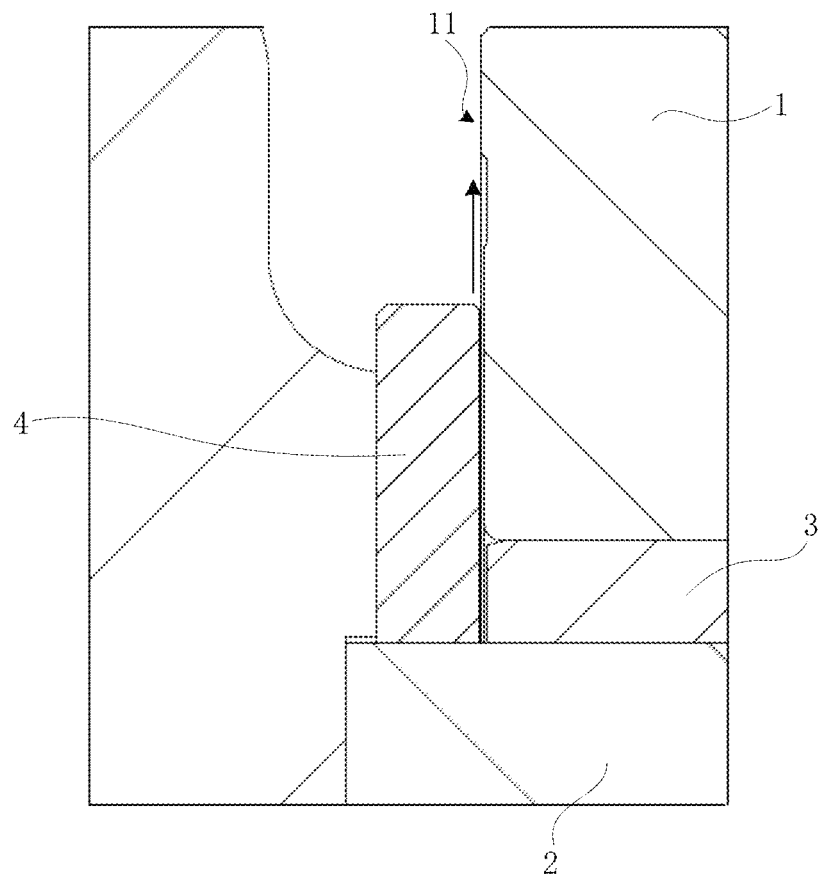
FIG. 2 shows a schematic diagram of a positional relationship of a thrust bearing at a left end surface of the planetary gear and a sliding bearing of FIG. 1.

An axial clearance 51 and a radial clearance 52 are formed between an outer surface of each convex ring 41 and an inner surface of the groove 13 opposite the convex ring 41. The axial clearance 51 and the radial clearance 52 are in communication with the gap. In this way, the flow rate of the lubricating oil from the sliding bearing in the axial clearance 51 and the radial clearance 52 is obviously limited, and the oil passage design in this embodiment facilitates the establishment of the oil pressure, as compared to the case where the lubricating oil is discharged directly in the radial direction shown in FIGS. 1-2, so that the sliding bearing can be lubricated with sufficient lubricating oil.

In this example, in the radial direction, the shortest distance between two adjacent convex rings is the same as the shortest distance between two other adjacent convex rings for ease of machining. That is, the convex rings 41 (and the corresponding grooves 13) are uniformly arranged in the radial direction.

In another preferred embodiment, in the radial direction, the shortest distance between two adjacent convex rings is different from the shortest distance between two other adjacent convex rings. For example, the shortest distance between two adjacent convex rings close to the sliding bearing is greater than the shortest distance between two adjacent convex rings away from the sliding bearing. That is, the convex rings are arranged more densely away from the sliding bearing, while the convex rings are arranged more sparsely close to the sliding bearing. In this way, the lubricating oil is relatively difficult to be discharged rapidly in a position away from the sliding bearing, so that sufficient oil pressure can be established to avoid insufficient lubrication of the sliding bearing caused by the rapid discharge of the lubricating oil.

For ease of machining, the convex ring 41 and the thrust bearing 4 are integrally formed.

In another preferred implementation, the convex ring is not integrally formed with the thrust bearing, but is fixedly connected to the thrust bearing. In addition, the convex ring has a coefficient of thermal expansion greater than that of the sliding bearing or than that of the planetary gear. Especially at higher temperatures, the flow rate of the lubricating oil is also higher, and the convex ring with a greater coefficient of thermal expansion can form narrower axial and radial clearances, limiting the rapid flow of lubricating oil and ensuring the lubricating effect of the sliding bearing.

Figure 4:
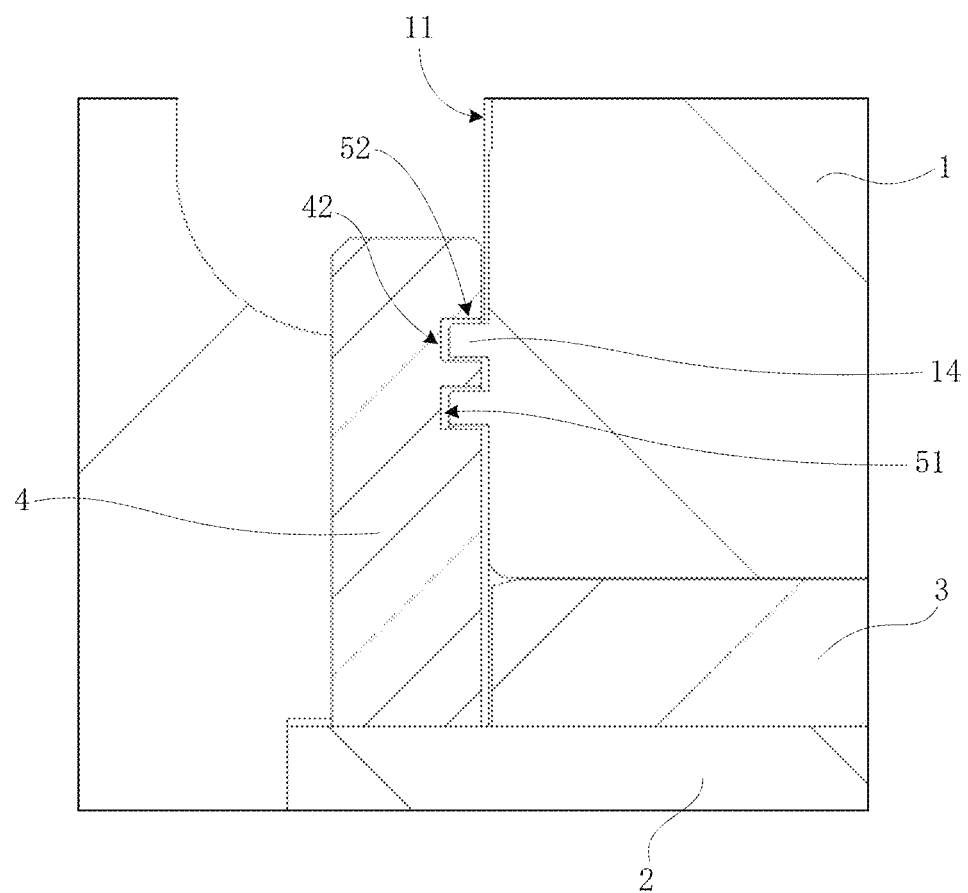
FIG. 4 is a schematic diagram of a lubricating mechanism of a planetary gear train according to a second embodiment of the present invention.

Referring next to FIG. 4, a second embodiment of the present invention will be described. In this embodiment, the arrangement of the planetary gear train is the same as the first embodiment, except that the end surface 11 of the planetary gear 1 facing the thrust bearing 4 is provided with at least one convex ring 14 (the case of two convex rings is taken as an example in FIG. 4). The convex rings 14 are arranged at intervals in a radial direction. The thrust bearing 4 is provided with grooves 42 facing the end surface of the planetary gear 11 and corresponding to the convex rings 14 on a one-to-one basis. Each groove 42 is configured to accommodate a corresponding convex ring 14. An axial clearance 51 and a radial clearance 52 are formed between an outer surface of each convex ring 14 and an inner surface of the groove 42 opposite the convex ring 14. The axial clearance 51 and the radial clearance 52 are in communication with the gap. The principle of the second embodiment is the same as the first embodiment, both of which complicate the oil passage of the lubricating oil by means of the axial clearance and the radial clearance, with the only difference being that the arrangement positions of the convex rings and the grooves are opposite to those in the first embodiment.

Likewise, the convex ring 14 may be integrally formed with the planetary gear 1. In some preferred embodiments, the convex ring 14 is not integrally formed with the planetary gear 1, but rather a separate member fixedly connected to the end surface 11 of the planetary gear 1. The material of the convex ring is selected such that the convex ring has a coefficient of thermal expansion greater than that of the sliding bearing or than that of the planetary gear.

Figure 5:
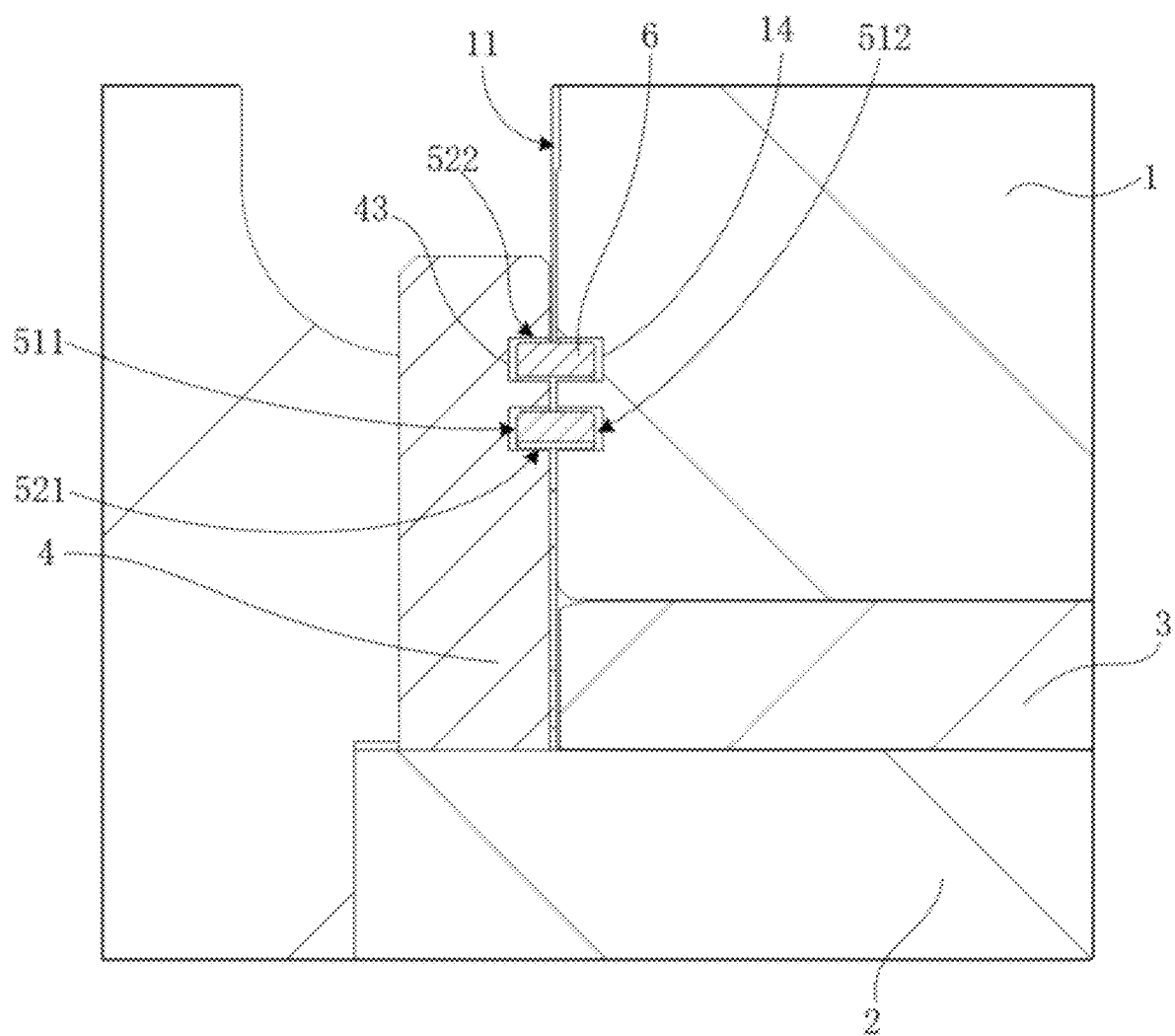
FIG. 5 is a schematic diagram of a lubricating mechanism of a planetary gear train according to a third embodiment of the present invention.

Referring now to FIG. 5, a lubricating mechanism according to a third embodiment of the present invention will be described. The arrangement of the planetary gear train is still the same as those of the above embodiments and will not be described in detail here. The differences lie in that the thrust bearing 4 is provided with at least one first groove 43 facing the end surface 11 of the planetary gear 1. The first grooves 43 are arranged at intervals in a radial direction. The end surface of the planetary gear 1 facing the thrust bearing 4 is provided with second grooves 14 corresponding to the first grooves 43 on a one-to-one basis. An accommodating space is formed by each first groove 43 and a corresponding second groove 14, and a barrier 6 is then provided in each accommodating space. Moreover, an axial clearance and a radial clearance are formed between an inner surface of each accommodating space and an outer surface of the barrier 6 accommodated in the accommodating space, where the axial clearance and the radial clearance are in communication with the gap.

Specifically, the axial clearance comprises:
a first axial clearance 511 jointly defined by a bottom surface of the first groove 43 and a side surface of the barrier 6 facing the first groove 43, and a second axial clearance 512 jointly defined by a bottom surface of the second groove 14 and a side surface of the barrier 6 facing the second groove 14.
the radial clearance comprises a first radial clearance 521 and a second radial clearance 522.

The first radial clearance 521 is defined by a side surface of the first groove 43 close to the sliding bearing, a side surface of the second groove 14 close to the sliding bearing, and a surface (a bottom surface of the barrier) of the barrier 6 facing the sliding bearing. During assembly, the barrier 6 rests on the side surface of the first groove 43 close to the sliding bearing and on the side surface of the second groove 14 close to the sliding bearing, and there is almost no first radial clearance at this point, but during operation of the planetary gear train, the first radial clearance occurs as the lubricating oil flows and the oil pressure is established.

The second radial clearance 522 is defined by a side surface of the first groove 43 away from the sliding bearing, a side surface of the second groove 14 away from the sliding bearing, and a surface (a top surface of the barrier) of the barrier 6 facing away from the sliding bearing.

In the radial direction, the shortest distance between two adjacent accommodating spaces is the same as the shortest distance between two other adjacent accommodating spaces. For ease of machining, the uniform arrangement of the first grooves and the second grooves is the most economical and convenient solution.

Of course, in the radial direction, the shortest distance between two adjacent accommodating spaces may be different from the shortest distance between two other adjacent accommodating spaces. Depending on different needs, each pair of first and second grooves may be reasonably positioned, thereby obtaining the desired oil pressure.

In this embodiment, the barrier 6 has a coefficient of thermal expansion greater than that of the sliding bearing or than that of the planetary gear.

In some preferred implementations, in the radial direction, the shortest distance between two adjacent accommodating spaces close to the sliding bearing is greater than the shortest distance between two adjacent accommodating spaces away from the sliding bearing. That is, the first grooves and the second grooves are relatively sparsely arranged close to the sliding bearing (near the lower position in FIG. 5); and the first grooves and the second grooves are relatively densely arranged away from the sliding bearing (near the upper position in FIG. 5).

By optimizing the shape of the oil passage extending radially from the sliding bearing to the planetary gear, embodiments of the present invention slow the discharge of the lubricating oil, ensuring that the sliding bearing always has sufficient lubricating oil to achieve adequate lubrication.

Although the specific implementations of embodiments of the present invention are described above, it should be appreciated by those skilled in the art that these are merely illustrative. Various changes or modifications to these implementations may be made by those skilled in the art without departing from the principle and spirit of the present disclosure, and these changes or modifications fall within the scope of the present disclosure.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A lubricating mechanism for a planetary gear train, the planetary gear train comprising:
 a planetary gear;
 a sliding bearing;
 a planetary gear shaft; and
 a thrust bearing,
 the planetary gear being supported on the planetary gear shaft by the sliding bearing,
 the thrust bearing being arranged at an end surface of the planetary gear, and
 a gap being formed between the thrust bearing and the end surface of the planetary gear,
 wherein the thrust bearing is provided with convex rings facing the end surface of the planetary gear, the convex rings being arranged at intervals in a radial direction;
 wherein the end surface of the planetary gear facing the thrust bearing is provided with grooves corresponding to the convex rings on a one-to-one basis, each groove being configured to accommodate a corresponding convex ring,
 wherein an axial clearance and a radial clearance are formed between an outer surface of each convex ring and an inner surface of the groove opposite the corresponding convex ring, and
 wherein the axial clearance and the radial clearance are in communication with the gap.

2. The lubricating mechanism of claim 1, wherein in the radial direction, a shortest distance between two adjacent convex rings is the same as a shortest distance between two other adjacent convex rings.

3. The lubricating mechanism of claim 1, wherein in the radial direction, a shortest distance between two adjacent convex rings is different from a shortest distance between two other adjacent convex rings.

4. The lubricating mechanism of claim 1, wherein the convex rings and the thrust bearing are integrally formed.

5. The lubricating mechanism of claim 1, wherein each convex ring has a coefficient of thermal expansion greater than a coefficient of thermal expansion of the sliding bearing or than a coefficient of thermal expansion of the planetary gear.

6. The lubricating mechanism of claim 1, wherein in the radial direction, a shortest distance between two adjacent convex rings close to the sliding bearing is greater than a shortest distance between two adjacent convex rings away from the sliding bearing.

7. A lubricating mechanism for a planetary gear train, the planetary gear train comprising:
   a planetary gear;
   a sliding bearing;
   a planetary gear shaft; and
   a thrust bearing,
   the planetary gear being supported on the planetary gear shaft by the sliding bearing,
   the thrust bearing being arranged at an end surface of the planetary gear, and
   a gap being formed between the thrust bearing and the end surface of the planetary gear,
   wherein the end surface of the planetary gear facing the thrust bearing is provided with convex rings, the convex rings being arranged at intervals in a radial directions,
   wherein the thrust bearing is provided with grooves facing the end surface of the planetary gear and corresponding to the convex rings on a one-to-one basis, each groove being configured to accommodate a corresponding convex ring,
   wherein an axial clearance and a radial clearance are formed between an outer surface of each convex ring and an inner surface of the groove opposite the corresponding convex ring, and
   wherein the axial clearance and the radial clearance are in communication with the gap.

8. The lubricating mechanism of claim 7, wherein in the radial direction, a shortest distance between two adjacent convex rings is the same as a shortest distance between two other adjacent convex rings.

9. The lubricating mechanism of claim 7, wherein in the radial direction, a shortest distance between two adjacent convex rings is different from a shortest distance between two other adjacent convex rings.

10. The lubricating mechanism of claim 7, wherein the convex rings and the planetary gear are integrally formed.

11. The lubricating mechanism of claim 7, wherein each convex ring has a coefficient of thermal expansion greater than a coefficient of thermal expansion of the sliding bearing or than a coefficient of thermal expansion of the planetary gear.

12. The lubricating mechanism of claim 7, wherein in the radial direction, a shortest distance between two adjacent convex rings close to the sliding bearing is greater than a shortest distance between two adjacent convex rings away from the sliding bearing.

13. A lubricating mechanism for a planetary gear train, the planetary gear train comprising:
   a planetary gear;
   a sliding bearing;
   a planetary gear shaft; and
   a thrust bearing,
   the planetary gear being supported on the planetary gear shaft by the sliding bearing,
   the thrust bearing being arranged at an end surface of the planetary gear, and
   a gap being formed between the thrust bearing and the end surface of the planetary gear,
   wherein the thrust bearing is provided with first grooves facing the end surface of the planetary gear, the first grooves being arranged at intervals in a radial direction,
   wherein the end surface of the planetary gear facing the thrust bearing is provided with second grooves corresponding to the first grooves on a one-to-one basis,
   wherein an accommodating space is formed by each first groove and a corresponding second groove,
   wherein a barrier is provided in each accommodating space,
   wherein an axial clearance and a radial clearance are formed between an inner surface of each accommodating space and an outer surface of the barrier accommodated in the accommodating space, and
   wherein the axial clearance and the radial clearance are in communication with the gap.

14. The lubricating mechanism of claim 13, wherein the axial clearance comprises:
   a first axial clearance jointly defined by a bottom surface of the first groove and a side surface of the barrier facing the first groove; and
   a second axial clearance jointly defined by a bottom surface of the second groove and a side surface of the barrier facing the second groove.

15. The lubricating mechanism of claim 13, wherein the radial clearance comprises a first radial clearance and a second radial clearance,
   wherein the first radial clearance is defined by a side surface of the first groove close to the sliding bearing, a side surface of the second groove close to the sliding bearing, and a surface of the barrier facing the sliding bearing, and
   the second radial clearance is defined by a side surface of the first groove away from the sliding bearing, a side surface of the second groove away from the sliding bearing, and a surface of the barrier facing away from the sliding bearing.

16. The lubricating mechanism of claim 13, wherein in the radial direction, a shortest distance between two adjacent accommodating spaces is the same as a shortest distance between two other adjacent accommodating spaces.

17. The lubricating mechanism of claim 13, wherein in the radial direction, a shortest distance between two adjacent accommodating spaces is different from a shortest distance between two other adjacent accommodating spaces.

18. The lubricating mechanism of claim 13, wherein the barrier has a coefficient of thermal expansion greater than a coefficient of thermal expansion of the sliding bearing or than a coefficient of thermal expansion of the planetary gear.

19. The lubricating mechanism of claim 13, wherein in the radial direction, a shortest distance between two adjacent accommodating spaces close to the sliding bearing is greater than a shortest distance between two adjacent accommodating spaces away from the sliding bearing.

* * * * *